United States Patent [19]
Dutton et al.

[11] Patent Number: 5,944,816
[45] Date of Patent: *Aug. 31, 1999

[54] MICROPROCESSOR CONFIGURED TO EXECUTE MULTIPLE THREADS INCLUDING INTERRUPT SERVICE ROUTINES

[75] Inventors: Drew J. Dutton; David S. Christie, both of Austin; Brian C. Barnes, Round Rock, all of Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/649,809

[22] Filed: May 17, 1996

[51] Int. Cl.⁶ .................................. G06F 9/30; G06F 9/38; G06F 9/46
[52] U.S. Cl. ........................... 712/215; 712/214; 712/228; 712/23; 710/266
[58] Field of Search ........................................ 395/390–393, 395/561, 569, 733, 734, 739, 595, 598; 712/200, 214–217, 220–221, 228–23; 710/260–261, 266

[56] References Cited

U.S. PATENT DOCUMENTS

| | | | |
|---|---|---|---|
| 4,905,190 | 2/1990 | Yokoyama | 395/678 |
| 5,421,014 | 5/1995 | Bucher | 395/670 |
| 5,515,538 | 5/1996 | Kleiman | 710/260 |
| 5,546,593 | 8/1996 | Kimura et al. | 395/569 |
| 5,649,225 | 7/1997 | White et al. | 395/800.23 |
| 5,724,565 | 3/1998 | Dubey et al. | 395/595 |
| 5,872,985 | 2/1999 | Kimura | 395/800.01 |

FOREIGN PATENT DOCUMENTS

| | | | |
|---|---|---|---|
| 0 538 817 | 4/1993 | European Pat. Off. | G06F 9/00 |

OTHER PUBLICATIONS

Hiroaki et al, "An Elementary Processor Architecture With Simultaneous Instruction Issuing From Multiple Threads," Computer Architecture News, vol. 20, No. 2, May 1, 1992, pp. 136–145.

"Register Banking for IBM System/370," IBM Technical Disclosure Bulletin, vol. 34, No. 4B, Sep. 1, 1991, pp. 372–373.

Byrd et al, "Multithreaded Processor Architectures," vol. 32, No. 8, Aug. 1995, New York US, pp. 38–46.

(List continued on next page.)

*Primary Examiner*—Zarni Maung
*Assistant Examiner*—Bharat Barot
*Attorney, Agent, or Firm*—Conley, Rose & Tayon; B. Noel Kivlin

[57] ABSTRACT

A microprocessor including a context file configured to store multiple contexts is provided. The microprocessor may execute multiple threads, each thread having its own context within the microprocessor. In one embodiment, the present microprocessor is capable of executing at least two threads concurrently: a task and an interrupt service routine. Interrupt service routines may be executed without disturbing a task's context and without performing a context save operation. Instead, the interrupt service routine accesses a context which is independent of the context of the task. In another embodiment, the context file includes multiple interrupt service routine contexts. Multiple ISR context storages allow for nested interrupts to be performed concurrently. In yet another embodiment, the microprocessor is configured to execute multiple tasks and multiple interrupt service routines concurrently. Multiple tasks may be executed concurrently by the microprocessor in addition to executing multiple interrupt service routines concurrently. In still another embodiment, the microprocessor includes a primary context and multiple local context storages coupled to each of its execution units. A given execution unit may execute instructions referencing the primary context or the local context connected thereto.

12 Claims, 7 Drawing Sheets

OTHER PUBLICATIONS

International Search Report for PCT/US 97/08361 dated Sep. 16, 1997.

Intel Corp., "MultiProcessor Specification", Version 1.1, Apr., 1994, pp. 1.1–Glossary 2.

Hummel, "PC Magazine Programmer's Technical Reference: The Processor and Coprocessor", 1992, pp. 153–182.

Intel Corp., "Microprocessor & Peripheral Handbook–vol. I Microprocessor", 1989, pp. 2–259 through 2–277.

Singh et al., "16–Bit and 32–Bit Microprocessors Architecture, Software, and Interfacing Techniques", 1991, pp. 302–305.

| Bits → 31 | 16 | 15 | 0 | Addr |
|---|---|---|---|---|
| 0 | | TR | | 0 |
| ESP0 | | | | 4 |
| 0 | | SS0 | | 8 |
| ESP1 | | | | C |
| 0 | | SS1 | | 10 |
| ESP2 | | | | 14 |
| 0 | | SS2 | | 18 |
| CR3 | | | | 1C |
| EIP | | | | 20 |
| EFLAGS | | | | 24 |
| EAX | | | | 28 |
| ECX | | | | 2C |
| EDX | | | | 30 |
| EBX | | | | 34 |
| ESP | | | | 38 |
| EBP | | | | 3C |
| ESI | | | | 40 |
| EDI | | | | 44 |
| 0 | | ES | | 48 |
| 0 | | CS | | 4C |
| 0 | | SS | | 50 |
| 0 | | DS | | 54 |
| 0 | | FS | | 58 |
| 0 | | GS | | 5C |
| 0 | | LDT | | 60 |
| I/O Bitmap Offset | | 0 | T | 64 |

MICROPROCESSOR CONFIGURED TO EXECUTE MULTIPLE THREADS INCLUDING INTERRUPT SERVICE ROUTINES

BACKGROUND OF THE INVENTION

1. Field of the Invention

The present invention is related to the field of microprocessors and, more particularly, to the interrupt handling mechanisms within microprocessors.

2. Description of the Relevant Art

Modern computer systems and the software which runs thereon demand a high performance interrupt structure in order to operate efficiently. Interrupts are used to switch between tasks, and so a multi-tasking operating system benefits from a high performance interrupt structure. A "multi-tasking" operating system is configured to run multiple programs concurrently. Additionally, interrupts provide a means for an electronic device external to the microprocessor to request attention from the operating system. Modern day computer systems are including increasing numbers of these electronic devices, prompting the need for a high performance interrupt structure.

Interrupts cause a microprocessor within the computer system to suspend execution of a task in order to execute a specific software routine (referred to as an interrupt service routine) comprising a set of instructions. The interrupt is typically unrelated to the instructions being executed by the microprocessor at the time the interrupt is signalled. Instead, the interrupt may be caused by an external device requiring software attention. For example, a buffer within an input/output device may fill with data to be transferred to another device or to memory. Many other sources for interrupts are well-known to the skilled artisan.

The instructions being executed by the microprocessor at the time the interrupt occurs are referred to herein as a "task". A task may be a portion of a program, an operating system routine, or even another interrupt service routine.

Because the interrupt is normally unrelated to the task being performed by the microprocessor and is asynchronous to the task itself, the interrupt service routine is executed in such a way that the task may be resumed. In order to resume the task, the "context" within which the task is executing may be saved to memory. The context of a task is the state of the microprocessor at a particular moment of time in which the task is executing. The context may include register values associated with the task when the task is interrupted. In other embodiments, context may be defined to include other values as well. When the context is saved, the register portion of the context may be saved to memory. After saving the context, the interrupt service routine may be executed. Upon completion of the interrupt service routine, the context may be restored to the microprocessor and the task is resumed. Since the restored context is substantially identical to the context when the task was interrupted, the task executes normally. In other words, the interrupt had no affect on the result of executing the task if the task is unrelated to the interrupt. Instead, only the time required to execute the task is affected.

The x86 architecture defines the context of 32 bit microprocessors to be 104 bytes. Other microprocessor architectures may define contexts having more or fewer bytes. Additionally, when the segment registers (which are part of the context in the x86 architecture) are reloaded, segment reloads are initiated to translate the segments. More bytes are transferred when the reload occurs, and clock cycles are required to translate the extra bytes into a format for storing within the microprocessor.

Unfortunately, storing and retrieving a large number of bytes to memory (as a context save entails) often requires a relatively large number of clock cycles. A clock cycle refers to the amount of time required by portions of the microprocessor to perform their functions. At the end of the clock cycle, the results of each function are stored in a storage location (e.g. a register or memory) and may be used by another function in the next clock cycle. The bus used by a microprocessor to communicate with other electrical devices may operate according to a different clock cycle than the microprocessor itself. The clock cycle associated with the bus is often referred to as the bus clock cycle.

If the context is saved by the microprocessor when an interrupt is recognized by the microprocessor, the interrupt is being handled via a "task switch". The interrupt service routine is isolated from the interrupted task such that any modifications the interrupt service routine performs to the microprocessor's context information will not affect the operation of the task when resumed. The context is restored prior to resuming the task. Often, an interrupt service routine will only require access to a few registers within the register set to perform its function. In this case, a full context save is not necessary since some registers will not be modified by the interrupt service routine. Instead, only those storage locations which must be changed in order to fetch the instructions within the interrupt service routine need be saved prior to beginning execution of the interrupt service routine. For example, in the x86 architecture the EIP register and CS segment register (which define the address and segment of the instructions to be fetched and executed) and the flags register (which is modified by many of the x86 instructions) are saved. These values are pushed onto the stack defined by the x86 architecture when not using the task switch method of interrupt handling.

When the task switch method of interrupt handling is not in use, an interrupt service routine must save the values stored within registers which it employs to carry out its intended function. Often, the values are stored on the stack. This method of interrupt handling is referred to as an interrupt gate or trap gate in the x86 architecture, depending on whether or not the interrupt service routine may itself be interrupted. If the interrupt service routine does not use all of the microprocessor's context, then clock cycles may be saved with respect to performing the full context save of a task switch. The interrupt service routine is entered and exited more rapidly since context save and restore is not performed. Unfortunately, at least a few registers must still be stored. Additionally, the interrupt service routines are lengthened by the number of instructions required to save and restore context values used by the interrupt service routines. Furthermore, an administrative burden is placed on the programmer of the interrupt service routine to update the save and restore portions of the routine when the routine is changed.

Since there are multiple sources of interrupts, the computer system provides a mechanism for identifying one of multiple interrupt service routines. The computer system thus provides flexibility to the programmer in that an interrupt service routine may be tailored to the needs of a particular device or interrupt source. Without the interrupt vector approach, all interrupts would fetch an interrupt service routine from the same address in memory. A relatively complicated routine stored at the address would need to be written to perform the handling of all types of interrupts from all electronic devices. As used herein, the term "fetching" refers to transferring the contents of a memory location to a destination.

One method for providing the address of the interrupt service routine for a given interrupt is for the microprocessor to request an interrupt vector from another electronic device in the system. An "interrupt vector" is a number which is indicative of a particular interrupt service routine. In the x86 microprocessor architecture, for example, the interrupt vector is an index into an interrupt vector table which provides information identifying the address of the associated interrupt service routine. The interrupt vector table is also referred to as an interrupt descriptor table.

In many computer systems, the interrupt vector is provided via a dedicated bus transaction. A "bus transaction" is a transfer of information across a bus. Bus transactions may include address and data information as well as the type of transfer. Bus transactions may be address-only, in which an address and related control information are broadcast; data-only, in which data and related control information are broadcast; or address-data in which both address and data are involved. As referred to herein, a bus transaction dedicated for interrupt processing is an interrupt acknowledge bus transaction. Typically, an interrupt acknowledge bus transaction is performed by the microprocessor to acknowledge the existence of an interrupt condition and then a second interrupt acknowledge bus transaction is performed to collect the interrupt vector. Unfortunately, many clock cycles are used to perform the two interrupt acknowledge bus transactions. Until the interrupt vector is known, the computer system may not begin fetching the interrupt service routine.

Current interrupt structures (as described above) require a large number of clock cycles to execute. Clock cycles are used to save and restore a task's context (either within the interrupt routine or prior to fetching it), to fetch the interrupt vector, and to execute the interrupt service routine. The execution time of the interrupted task is lengthened considerably, deleteriously affecting performance. A method for servicing interrupts in a computer system without deleteriously affecting performance of the interrupted task is desired.

SUMMARY OF THE INVENTION

The problems outlined above are in large part solved by a microprocessor according to the present invention. The present microprocessor includes a context file configured to store multiple contexts. The microprocessor may execute multiple threads, each thread having its own context within the microprocessor. In one embodiment, the present microprocessor is capable of executing at least two threads concurrently: a task and an interrupt service routine. Advantageously, interrupt service routines may be executed without disturbing a task's context and without performing a context save operation (either within the interrupt service routine or prior to entering the interrupt service routine). Instead, the interrupt service routine accesses a context which is independent of the context of the task. In another embodiment, the context file of the present microprocessor includes multiple interrupt service routine contexts. Multiple ISR context storages allow for nested interrupts to be performed concurrently, advantageously increasing interrupt service performance. Previously, interrupt nesting required actions similar to the interruption of a task with respect to the interrupted interrupt service routine. These context saving actions may be eliminated through the use of multiple ISR context storages. In yet another embodiment, the present microprocessor is configured to execute multiple tasks and multiple interrupt service routines concurrently. Advantageously, multiple tasks may be executed concurrently by the present microprocessor in addition to executing multiple interrupt service routines concurrently.

In still another embodiment, the present microprocessor includes a primary context and multiple local context storages coupled to each of its execution units. A given execution unit may execute instructions referencing the primary context or the local context connected thereto. Advantageously, one or more execution units may be dedicated for executing interrupt service routines (whose context is stored in the local context storage) while other units remain available for executing tasks. Furthermore, when no interrupt service routines are executed by the present microprocessor, the execution units dedicated for executing interrupt service routines may advantageously execute instructions associated with a task. When an interrupt is signalled, the dedicated unit may switch to executing the interrupt service routine without requiring a context save. The instructions instead access their individual contexts according to their thread tags, which identify the thread to which an instruction belongs.

Broadly speaking, the present invention contemplates a microprocessor comprising an instruction cache, an instruction decode unit, a plurality of execution units, and a context file. The instruction cache is configured to store a plurality of instruction blocks and a plurality of thread tags. Each of the plurality of thread tags is associated with at least one of the plurality of instruction blocks and identifies a thread to which the associated instruction blocks belong. Coupled to the instruction cache is the instruction decode unit. The instruction decode unit is configured to decode instructions associated with multiple threads and to transfer the instructions to the plurality of execution units. The plurality of execution units are coupled to the instruction decode unit and are configured to execute the instructions, producing a plurality of results. Coupled to receive the plurality of results, the context file is configured to store the plurality of results. Each of the plurality of results is stored according to the thread tag associated with the instruction producing the result.

The present invention still further contemplates a computer system comprising a microprocessor and an interrupt controller. The microprocessor is configured to concurrently execute multiple threads, including interrupt service routines. The microprocessor is further configured to execute an interrupt service routine upon receipt of an interrupt signal. The interrupt controller is coupled to convey the interrupt signal to the microprocessor.

BRIEF DESCRIPTION OF THE DRAWINGS

Other objects and advantages of the invention will become apparent upon reading the following detailed description and upon reference to the accompanying drawings in which:

FIG. 6 is a diagram of one embodiment of a context.

Figure 1:
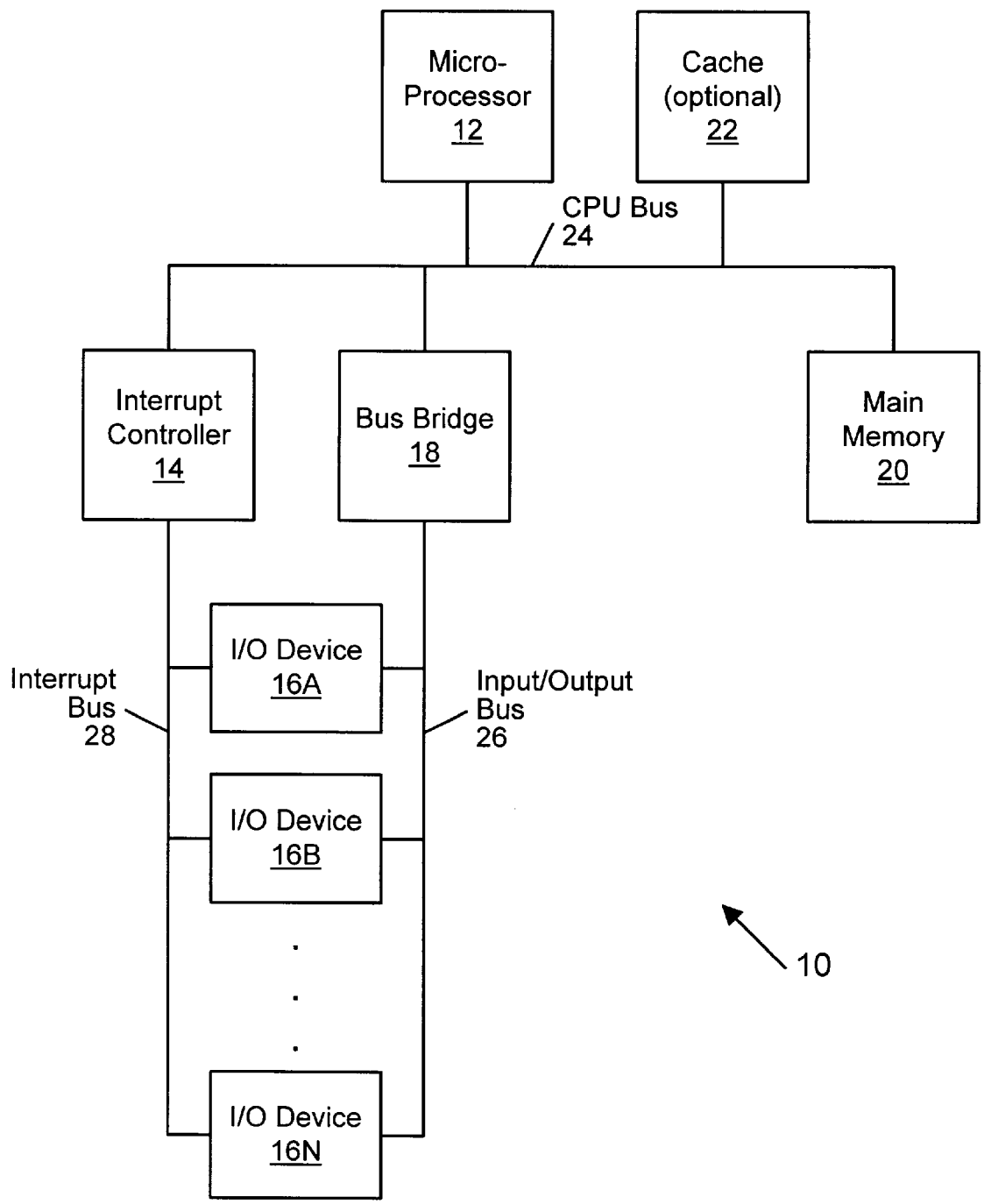
FIG. 1 is a block diagram of one embodiment of a computer system including a microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, one embodiment of a computer system 10 including a microprocessor 12, an interrupt controller 14, a plurality of input/output (I/O) devices 16A–16N (referred to collectively as I/O devices 16), a bus bridge 18, a main memory 20, and a cache 22 is shown. Microprocessor 12, interrupt controller 14, bus bridge 18, main memory 20, and cache 22 are coupled to a CPU bus 24 which effects high speed, high bandwidth communication between the connected devices. Lower speed, lower bandwidth communication is provided for I/O devices 16 via input/output bus 26. I/O devices 16 are coupled to interrupt controller 14 via an interrupt bus 28.

Microprocessor 12 is a high performance microprocessor configured to execute instructions stored in main memory 20. In one embodiment, microprocessor 12 implements the x86 microprocessor architecture. Microprocessor 12 includes storage elements configured to store the context of a task being executed by microprocessor 12. In addition, microprocessor 12 includes storage elements configured to store alternate context information. In one embodiment, this alternate context information includes context information associated with interrupt service routines. Interrupt service routines may be executed concurrently with tasks, and therefore no context save need be performed by microprocessor 12. Advantageously, interrupt service routines may be executed without disturbing a task's context and without performing a context save operation (either within the interrupt service routine or prior to entering the interrupt service routine).

Interrupt bus 28 includes at least one interrupt conductor per I/O device 16A–16N. An interrupt request signal conveyed on the associated interrupt conductor is indicative of a request for interrupt of microprocessor 12 by the associated I/O device 16A–16N. Interrupt controller 14 is configured to receive the interrupt request signals and to convey an interrupt signal to microprocessor 12 upon CPU bus 24 in response to the interrupt request signals. In one embodiment, interrupt controller 14 is similar to an 8259A interrupt controller used in IBM compatible personal computer systems. In another embodiment, interrupt controller 14 includes multiple interrupt controllers similar to the 8259A cascaded to allow a larger number of I/O devices 16 to be connected. Interrupt controller 14 is programmable, and may be enabled to assert the interrupt signal individually for each interrupt request signal. In other words, interrupt controller 14 may be enabled to assert the interrupt signal if the interrupt request signal from I/O device 16A is asserted but not if the interrupt request signal from I/O device 16B is asserted (or vice-versa). In another embodiment, interrupt controller 14 may be programmed with a priority scheme for the interrupt request signals. The priority scheme is devised such that, if multiple interrupt request lines are asserted concurrently: the highest priority interrupt request is serviced first; followed by the next highest priority interrupt request; etc.

Interrupt controller 14 provides the interrupt vector which identifies the location of the interrupt service routine associated with the interrupting I/O device 16A–16N. The interrupt vector is transferred across CPU bus 24 after microprocessor 12 acknowledges receipt of the interrupt signal. In one embodiment, microprocessor 12 issues an interrupt acknowledge bus transaction on CPU bus 24 when acknowledging the interrupt signal, and then issues a second interrupt acknowledge bus transaction to collect the interrupt vector. Other transactions upon CPU bus 24 are used to transfer data among devices coupled to CPU bus 24. An exemplary bus implementing such an interrupt acknowledge transaction may be found within the publication entitled: "16-bit and 32-bit Microprocessors Architecture, Software and Interfacing Techniques" by Singh, et al, Prentice Hall, Englewood Cliffs, N.J., 1991. This publication is incorporated herein by reference in its entirety. Often the interrupt acknowledge transactions are received by interrupt controller 14 upon a bus other than CPU bus 24. For example, the interrupt acknowledge bus transaction may be conveyed by bus bridge 18 onto I/O bus 26. Interrupt controller 14 may be coupled to I/O bus 26 in order to receive the interrupt acknowledge bus transaction. Interrupt controller 14 is, however, still coupled to the interrupt conductor of CPU bus 24 (to which microprocessor 12 is coupled). In other embodiments, interrupt controller 14 may receive interrupt acknowledge bus transactions directly from CPU bus 24 or from yet another bus coupled to CPU bus 24 via one or more bus bridges similar to bus bridge 18.

Bus bridge 18 is provided to assist in communications (other than interrupt requests) between I/O devices 16 and devices coupled to CPU bus 24. I/O devices 16 typically require longer bus clock cycles than microprocessor 12 and other devices coupled to CPU bus 24. Therefore, bus bridge 18 provides a buffer between CPU bus 24 and input/output bus 26. Additionally, bus bridge 18 translates transactions from one bus protocol to another. In one embodiment, input/output bus 26 is an Enhanced Industry Standard Architecture (EISA) bus and bus bridge 18 translates from the CPU bus protocol to the EISA bus protocol. In another embodiment, input/output bus 26 is a Peripheral Component Interconnect (PCI) bus and bus bridge 18 translates from the CPU bus protocol to the PCI bus protocol. It is noted that many variations of CPU bus protocols exist. Microprocessor 12 may employ any suitable bus protocol.

I/O devices 16 provide an interface between computer system 10 and other devices external to the computer system. Exemplary I/O devices include a modem, a serial or parallel port, a sound card, etc. I/O devices 16 may also be referred to as peripheral devices. Main memory 20 stores data and instructions for use by microprocessor 12. In one embodiment, main memory 20 includes at least one Dynamic Random Access Memory (DRAM) cell and a DRAM memory controller. Cache 22 is a small, high speed memory for temporarily storing data and instructions from main memory 20. If microprocessor 12 requests an address from main memory 20 and cache 22 is storing data associated with the requested address, then cache 22 provides the data. Cache 22 is an optional component, computer system 10 is fully functional without it. However, cache 22 may improve the performance of computer system 10. It is noted that cache 22 may also be inserted between microprocessor 12 and CPU bus 24 in other embodiments. It is further noted that microprocessor 12 may incorporate a cache such that cache 22 is a second level cache. Additionally, one embodiment of microprocessor 12 incorporates second level cache 22.

A second embodiment of computer system 10 is contemplated in which I/O devices 16 are coupled to CPU bus 24. Interrupt controller 14 and bus bridge 18 may not be included in this embodiment. Instead, each I/O device 16 individually responds to interrupt acknowledge bus transactions in a manner similar to interrupt controller 14. It is noted that although computer system 10 as shown in FIG. 1 includes one microprocessor, other embodiments of computer system 10 may include multiple microprocessors similar to microprocessor 12. It is further noted that the above discussion refers to the assertion of various signals. As used herein, a signal is "asserted" if it conveys a value indicative of a particular piece of information. Conversely, a signal is "deasserted" if it conveys a value indicative of a lack of a particular piece of information. A signal may be defined to be asserted when it conveys a logical zero value or, conversely, when it conveys a logical one value. It is still further noted that devices attached to CPU bus 24 may also convey interrupt request signals to interrupt controller 14.

Figure 2:
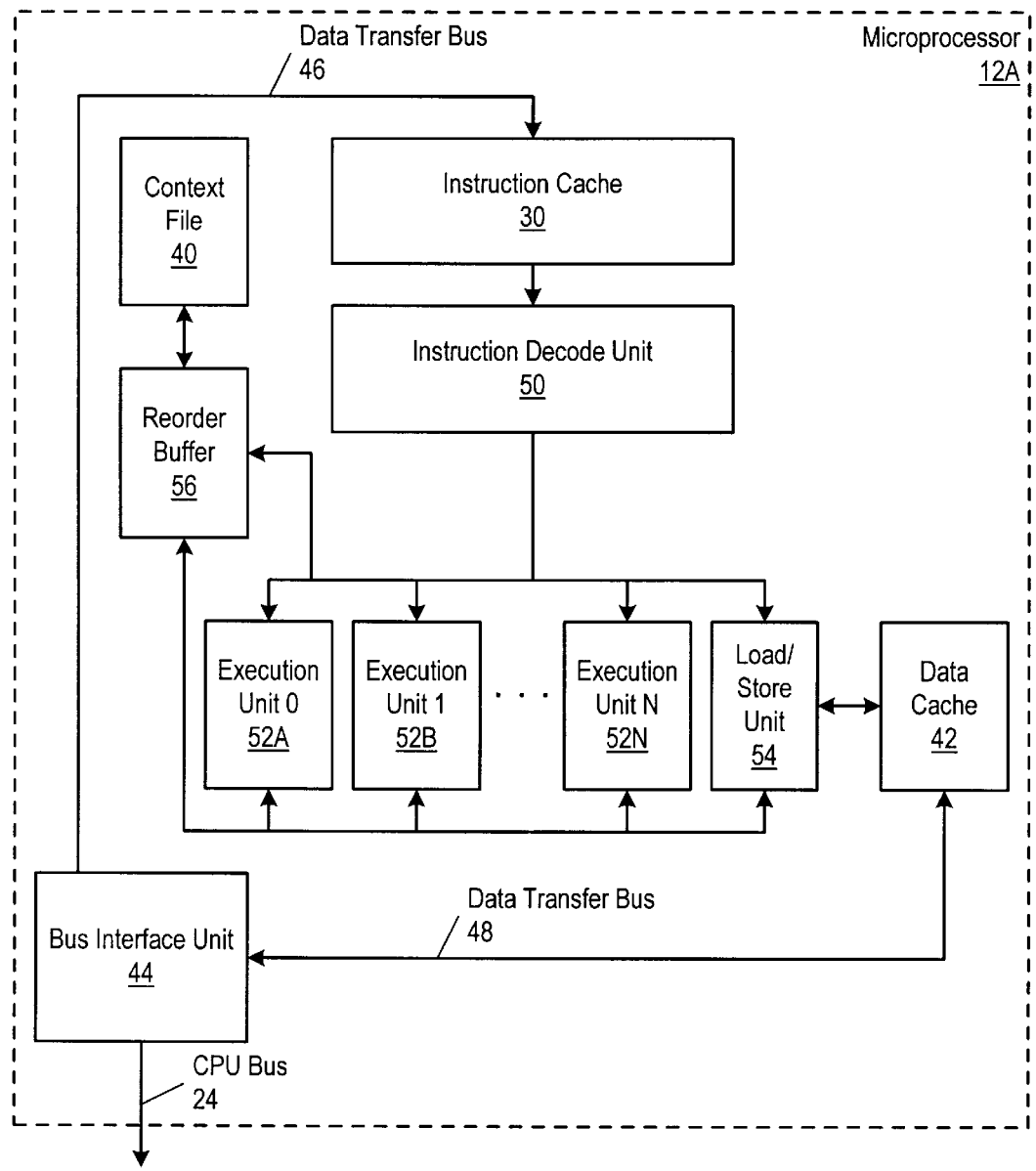
FIG. 2 is a block diagram of one embodiment of the microprocessor shown in FIG. 1, including a context file.

Turning now to FIG. 2, a block diagram of one embodiment of microprocessor 12 (microprocessor 12A) is shown. Microprocessor 12A includes a bus interface unit 44, an instruction cache 30, a data cache 42, and a context file 40. Bus interface unit 44 is coupled to instruction cache 30 via an instruction transfer bus 46. Similarly, bus interface unit 44 is coupled to data cache 42 via a data transfer bus 48. Additionally, microprocessor 12A includes a multiple instruction decode unit 50 coupled between instruction cache 30 and a plurality of execution units 52A–52N (referred to collectively as execution units 52). A load/store unit 54 is included to interface between execution units 52 and data cache 42. Finally, a reorder buffer 56 is coupled to decode unit 50, execution units 52, and load/store unit 54.

Generally speaking, microprocessor 12A is configured to execute multiple tasks concurrently. One of the multiple tasks being executed is referred to herein as a "thread". For each thread being executed, a context storage within context file 40 is allocated. Because each thread has its own context, it may execute along with other threads without interfering with those threads. In one embodiment, microprocessor 12A is configured to execute at least two threads concurrently. One thread is the main task being executed by microprocessor 12A, and the second thread is an interrupt service routine.

Instruction cache 30 is a high speed cache memory configured to store instruction blocks. An instruction block is a plurality of instructions stored within contiguous bytes of main memory 20. In one embodiment, an instruction block is the number of instruction bytes stored within a cache line of instruction cache 30. Each instruction block is associated with a thread tag stored within instruction cache 30. The thread tag identifies an instruction block as part of a particular thread executing upon microprocessor 12A, and may be assigned when the instruction block is transferred from main memory to instruction cache 30. It is noted that instruction cache 30 may be configured into a set-associative, direct mapped, or fully associative configuration. Additionally, instruction cache 30 may detect branches and perform branch prediction. Any branch prediction mechanism may be used.

When instructions are fetched from instruction cache 30 into instruction decode unit 50, the associated thread tag is conveyed along with each instruction. The thread tag identifies which context storage within context file 40 the instructions are intended to access. Context values, such as register values, are conveyed from context file 40 and stored into context file 40 according to the context value requested and the thread tag associated with the instruction. Therefore, each thread is isolated from other threads executing upon microprocessor 12A.

In one embodiment, microprocessor 12A is configured to execute at least two threads. One of the threads is an interrupt service routine. The interrupt service routine is executed when bus interface unit 44 receives an interrupt signal upon CPU bus 24 and performs interrupt acknowledge bus transactions to receive the interrupt vector. Once the address of the interrupt service routine is determined from the received interrupt vector, bus interface unit 44 signals instruction cache 30 to begin thread execution at the interrupt service routine address. If the instructions comprising the interrupt service routine reside within the cache, the thread tag stored with the interrupt service routine is used and the interrupt service routine begins execution. If the interrupt service routine is not stored within instruction cache 30, then the instructions are transferred from main memory 20 to instruction cache 30. Instruction cache 30 assigns a thread tag to the instructions from thread tags which are not currently in use within microprocessor 12A.

Figure 2A:
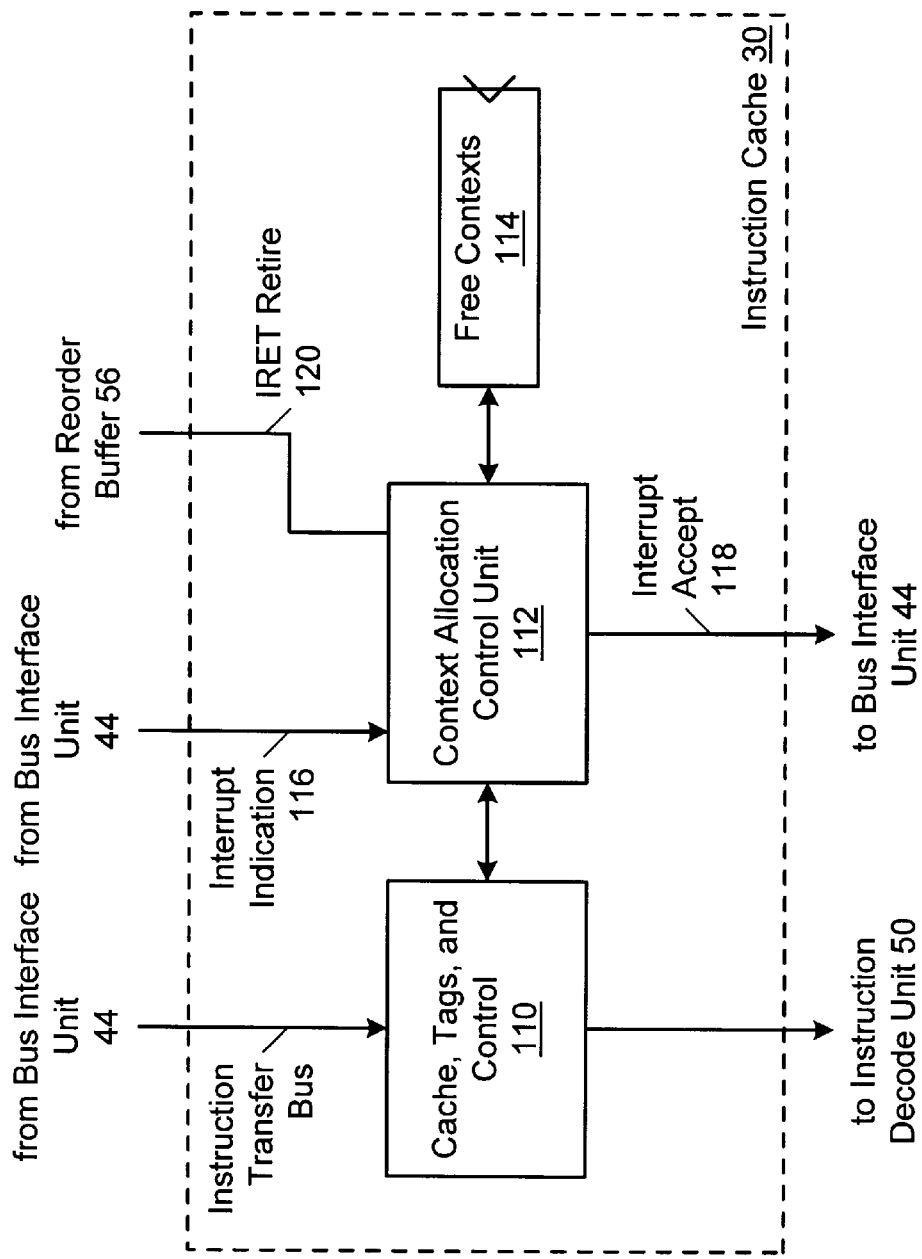
FIG. 2A is a block diagram of one embodiment of an instruction cache shown in FIG. 2.

Turning to FIG. 2A, a block diagram of one embodiment of instruction cache 30 is shown. Instruction cache 30 includes a cache, tags, and control unit 110, a context allocation control unit 112, and a free contexts storage 114. Instruction transfer bus 46 is coupled to cache, tags, and control unit 110. Additionally, cache, tags and control unit 110 is configured to transmit instructions to instruction decode unit 50. Context allocation control unit 112 is configured to receive an interrupt indication upon an interrupt indication conductor 116, and is further configured to convey an interrupt accept indication upon interrupt accept conductor 118. Additionally, context control unit 112 is coupled to an IRET retire bus 120 from reorder buffer 56. When an IRET instruction is retired, the thread tag corresponding to the instruction is conveyed upon IRET retire bus 120. Context allocation control unit 112 is coupled to cache, tags, and control unit 110 and to free contexts storage 114.

Context allocation control unit 112 is configured to allocate thread tags (and therefore the corresponding context within context file 40) to interrupt service routines. Bus interface unit 44 informs context allocation control unit 112 when an interrupt is signalled from CPU bus 24. If a thread tag is available (i.e. if free contexts storage 114 indicates that a context may be allocated), then context allocation control unit 112 allocates the thread tag to the interrupt service routine. Context allocation control unit 112 provides the allocated thread tag to cache, tags, and control unit 110. Cache, tags, and control unit 110 associates the thread tag with instructions fetched from the interrupt service routine. Additionally, upon thread tag allocation, context allocation control unit 112 asserts an acceptance indication upon interrupt accept conductor 118. Bus interface unit 44, upon receipt of the acceptance indication, acknowledges the interrupt upon CPU bus 24. If a thread tag is not available, context allocation control unit 112 does not assert the acceptance indication. Bus interface unit 44 thereby withholds interrupt acknowledgement until a thread tag becomes available.

When reorder buffer 56 retires an IRET instruction (i.e. an interrupt return instruction indicating that an interrupt service routine has been completed), the thread tag associated with the IRET instruction is conveyed upon IRET retire bus 120. Upon receipt of the thread tag, context allocation control unit stores an indication of the thread tag into free contexts storage 114. The thread tag is thereby released from association with the interrupt service routine and may be assigned to another thread.

Software (e.g. the operating system executing within computer system 10) may also access free contexts storage 114. The software may select a thread tag which is available (as indicated in free contexts storage 114) and assign the thread tag to a task being executed by microprocessor 12. Upon assigning the thread tag, the software stores an indication of the context allocation into free contexts storage 114. Because the context is indicated as allocated, context allocation control unit 112 does not allocate the context to an interrupt service routine. The software additionally releases the context when the task has completed by storing an indication of the released thread tag into free contexts storage 114. The software may additionally request the total number of contexts available within microprocessor 12 from context allocation control unit 112, to thereby determine thread tag availability.

In one embodiment, free contexts storage 114 is configured to store a bit corresponding to each context within microprocessor 12. When the bit is set, the corresponding context is free (i.e. available for allocation). When the bit is clear, the corresponding context is in use (i.e. not available for allocation). Context allocation control unit 112 clears the bit when the context is allocated to an interrupt service routine, and sets the bit when the context is released via retirement of an interrupt return instruction. Similarly, software may set and clear the bit when allocating and deallocating the corresponding context.

Returning now to FIG. 2, microprocessor 12A is a superscalar microprocessor configured to execute multiple instructions during a clock cycle. Decode unit 50 therefore decodes multiple instructions during a single clock cycle and dispatches the instructions to execution units 52 and load/store unit 54. The instructions decoded and dispatched from decode unit 50 during a clock cycle may be associated with more than one thread. Additionally, a storage location within reorder buffer 56 is allocated for each decoded and dispatched instruction. The storage locations are allocated to instructions in the order they occur within the thread, so that the results created by executing the instructions may be recorded in register file 40 or data cache 42 in program order. Storage locations may be allocated in any order with respect to instructions from different threads.

By including reorder buffer 56, instructions may be speculatively executed out of order by execution units 52. In one embodiment, execution units 52 are asymmetrical execution units. Each execution unit 52A–52N is configured to execute a particular subset of microprocessor 12A's instruction set. The particular subset of the instruction set which execution unit 52A is configured to execute may differ from the particular subset of the instruction set which execution unit 52B is configured to execute. Similarly, other execution units may have differing particular subsets of the instruction set. In another embodiment, execution units 52 are symmetrical execution units. Each execution unit 52A–52N is configured to execute a similar subset of the instruction set. When an execution unit 52 executes an instruction, it produces a result according to the intended operation of the instruction. The result is stored in a destination, which may be a register or a memory location.

It is noted that decode unit 50 is capable of decoding a certain number of instructions during a clock cycle. When multiple threads are being executed concurrently by microprocessor 12A, the certain number may be allocated among the threads. Although any allocation method may be used, in one embodiment decode unit 50 decodes an equal number of instructions from each of the multiple threads during a clock cycle. It is further noted that instructions are considered to be in order with respect to other instructions within the same thread. Instructions from different threads have no ordering relationship to each other.

Reorder buffer 56 provides dependency checking and result forwarding such that each instruction receives the correct operand values prior to that instruction being executed. Reorder buffer 56 includes temporary storage for the result of each instruction until that instruction is retired. An instruction is retired by storing its result into context file 40 or data cache 42 (if needed) and deleting the instruction from reorder buffer 56. If an instruction decoded by decode unit 50 requires the result of an instruction which has not yet executed, then a tag indicative of which reorder buffer storage location will store that result is forwarded to the execution unit receiving the instruction in lieu of the operand value. The execution unit then monitors the results produced by the execution units for the provided tag. When the result is generated, the execution unit generating the result conveys the tag along with the result to reorder buffer 56. The execution unit awaiting the tag captures the result and stores it along with the instruction for later execution. Monitoring for the register tag and capturing the associated result is referred to as "result forwarding". It is noted that any suitable reorder buffer configuration may be employed by microprocessor 12A. It is further noted that dependency checking involves not only determining which result is needed by an instruction, but also determining which context the results stored within reorder buffer 56 are associated with. A dependency exists if a particular result from a particular context is stored within reorder buffer 56.

In one embodiment, execution units 52 execute all instructions within the instruction set of microprocessor 12A except for load and store instructions. Load/store unit 54 executes the load and store instructions. Additionally, dependencies between load and store instructions are detected and resolved by load/store unit 54.

Data cache 42 is a high speed cache memory configured to store data being manipulated by microprocessor 12A. It is understood that data cache 42 may be configured into a set-associative or direct mapped configuration.

Bus interface unit 44 effects communication between microprocessor 12A and other devices coupled to CPU bus 24. For example, instruction code fetches which miss in instruction cache 30 are transferred from main memory 20 (shown in FIG. 1) to instruction cache 30 through bus interface unit 44. Additionally, data memory accesses which miss data cache 42 are transferred from main memory 20 to data cache 42. Data cache 42 may store modified data which must be written back to main memory 20, the transfer of which is also effected by bus interface unit 44.

Bus interface unit 44 is adapted to receive the aforementioned interrupt signal upon CPU bus 24 as well. When the interrupt signal is received in a state indicative of a request for interrupt, bus interface unit 44 conveys a signal indicative of interrupt to instruction cache 30. Bus interface unit 44 reads the interrupt vector from interrupt controller 14 and performs the appropriate translation of the interrupt vector into an interrupt address. For example, in the x86 architecture the interrupt vector is used as an index into an interrupt descriptor table which provides protection information indicative of the privilege level and allowable memory access of the interrupt service routine as well as the interrupt service routine address. The interrupt service routine address is then conveyed to instruction cache 30.

Execution units 52 and load/store unit 54 may employ reservation stations to store instructions dispatched to the unit. An instruction remains in the reservation station until all of its operands are available, and then is executed by the associated execution unit. It is noted that the above mentioned reservation stations may be configured outside of the associated execution unit.

Additional information regarding microprocessors may be found within the commonly assigned, co-pending patent application entitled "High Performance Superscalar Microprocessor", U.S. Ser. No. 08/146,382, filed Oct. 29, 1993 by Witt, et al, now abandoned. Further information regarding microprocessors may be found within the commonly assigned, co-pending patent application entitled "Superscalar Microprocessor Including a High Performance Instruction Alignment Unit", U.S. Ser. No. 08/377,843, filed Jan. 25, 1995 by Witt, et al, now abandoned. The disclosures of these patent applications are incorporated herein by reference in their entirety.

Figure 3:
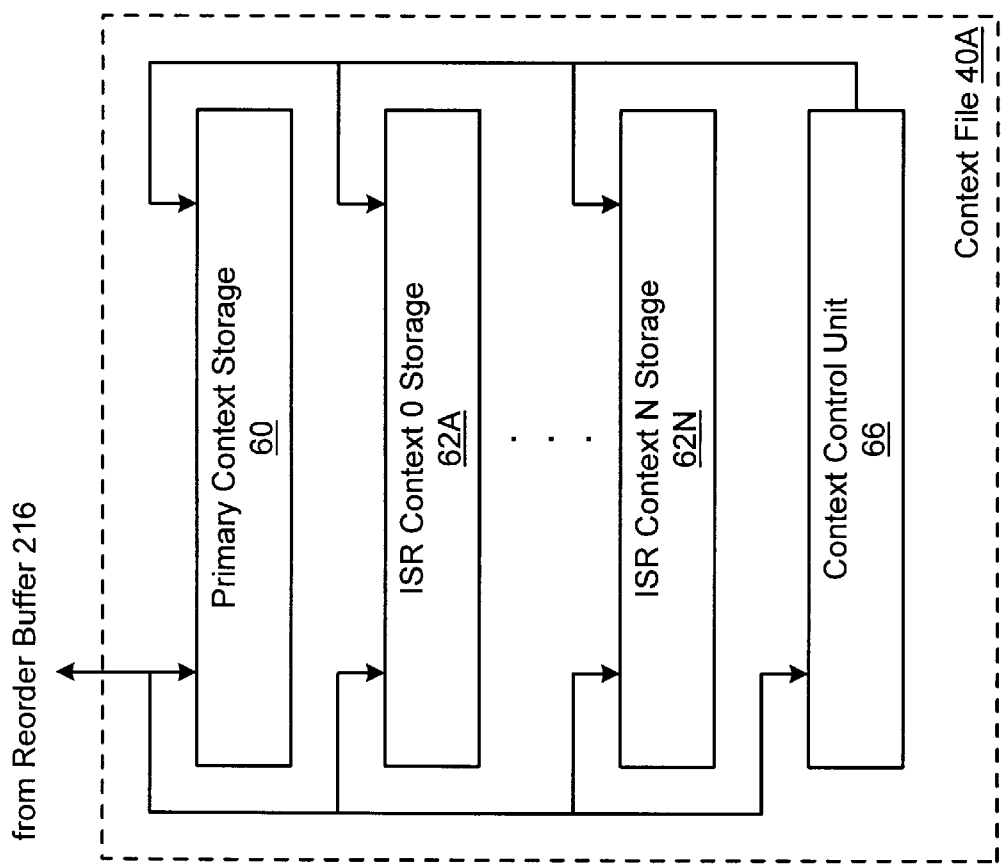
FIG. 3 is a block diagram of one embodiment of the context file shown in FIG. 2.

Turning now to FIG. 3, a first embodiment of context file 40 (context file 40A) is shown. Context file 40A includes a primary context storage 60 as well as multiple interrupt service routine (ISR) context storages 62A–62N (collectively referred to as context storages 62). In one embodiment, context file 40A includes N ISR context storages 62. Primary context storage 60 stores the context associated with a task being executed by microprocessor 12A. Each ISR context storage stores the context associated with an interrupt service routine.

Microprocessor 12A, when configured with context file 40A, may execute a task and multiple interrupt service routines as concurrent threads. Multiple ISR context storages allow for nested interrupts to be performed concurrently, advantageously increasing interrupt service performance. Interrupt nesting occurs when an interrupt service routine is itself interrupted by a second interrupt being signalled by interrupt controller 14. Previously, interrupt nesting required actions similar to the interruption of a task with respect to the interrupted interrupt service routine. These context saving actions may be eliminated through the use of multiple ISR context storages.

It is noted that, in one embodiment, primary context storage 60 includes a complete context of microprocessor 12A. Similarly, ISR context storages 62 store a complete context in one embodiment. In another embodiment, ISR context storages 62 store a subset of the context of microprocessor 12A. When a subset of the context is stored by ISR context storages 62, then the interrupt service routines which may be executed upon microprocessor 12A are constrained to use that subset. For example, ISR context storages 62 may contain a subset of the registers employed within microprocessor 12A's microprocessor architecture. Interrupt service routines may only encode instructions utilizing those registers within the subset.

Context file 40A further includes a context control unit 66 coupled to primary context storage 60 and ISR context storages 62. Context storage unit 60 receives the requests for context values from reorder buffer 216 and identifies which context storage is affected. Reorder buffer 216 conveys a value indicative of the context value requested as well as the thread tag associated with the instruction for which the request is performed. The request may be to update a context value with the result of an instruction or a request for a context value to be used as an operand of an instruction. Context control unit 66 conveys a set of control signals to primary context storage 60 and ISR context storages 62. The control signals are indicative of which context storage is selected to respond to the access. It is noted that reorder buffer 216 is configured to convey multiple requests during a clock cycle to context storage 40A. Each request is treated independently and in parallel by context control unit 66.

Figure 4:
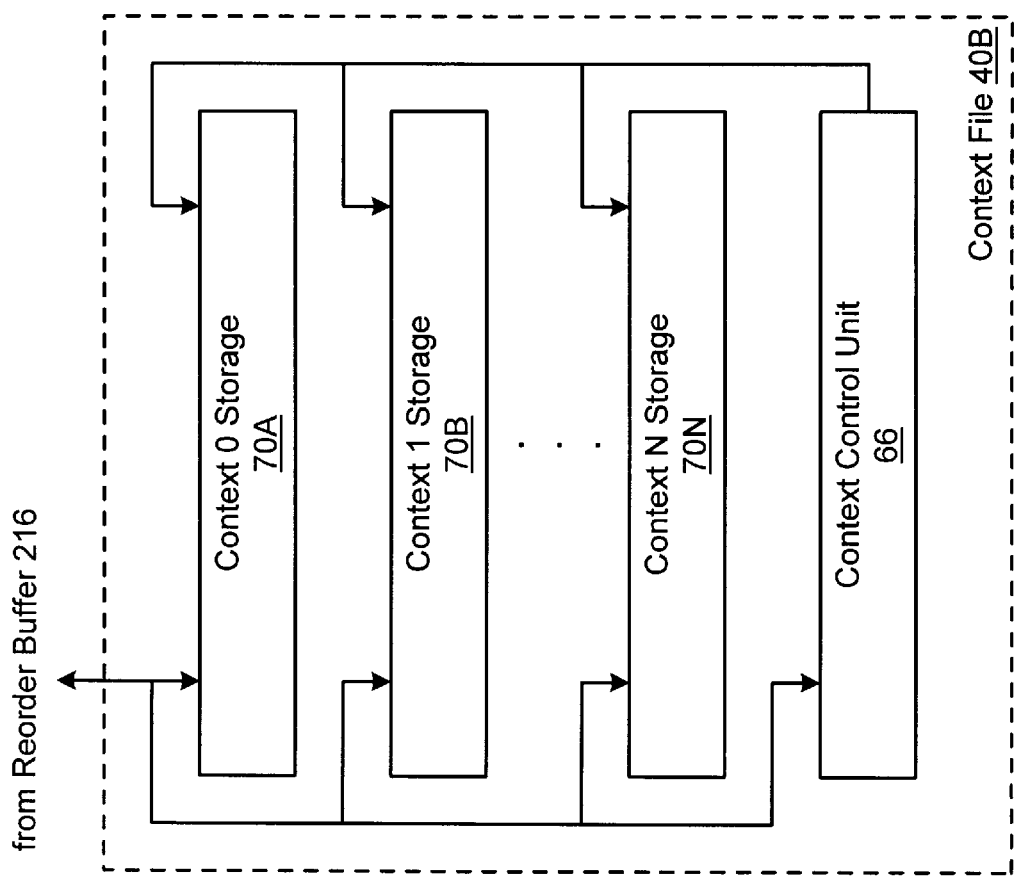
FIG. 4 is a block diagram of another embodiment of the context file shown in FIG. 2.

Turning now to FIG. 4, a second embodiment of context file 40 (context file 40B) is shown. Context file 40B includes a plurality of context storages 70A–70N (collectively referred to as context storages 70). Each context storage 70A–70N may store a full context or a subset of a context. Additionally included in context file 40B is a context control unit 66, similar to context control unit 66 as shown in FIG. 3.

Microprocessor 12A, when equipped with context file 40B may execute multiple tasks as well as multiple interrupt service routines as threads. Each task executes with a context storage 70 which includes a full context. Interrupt service routines may execute with a context storage 70 which includes either a full or partial context. Advantageously, multiple tasks may be executed concurrently by microprocessor 12A in addition to executing multiple interrupt service routines concurrently.

Figure 5:
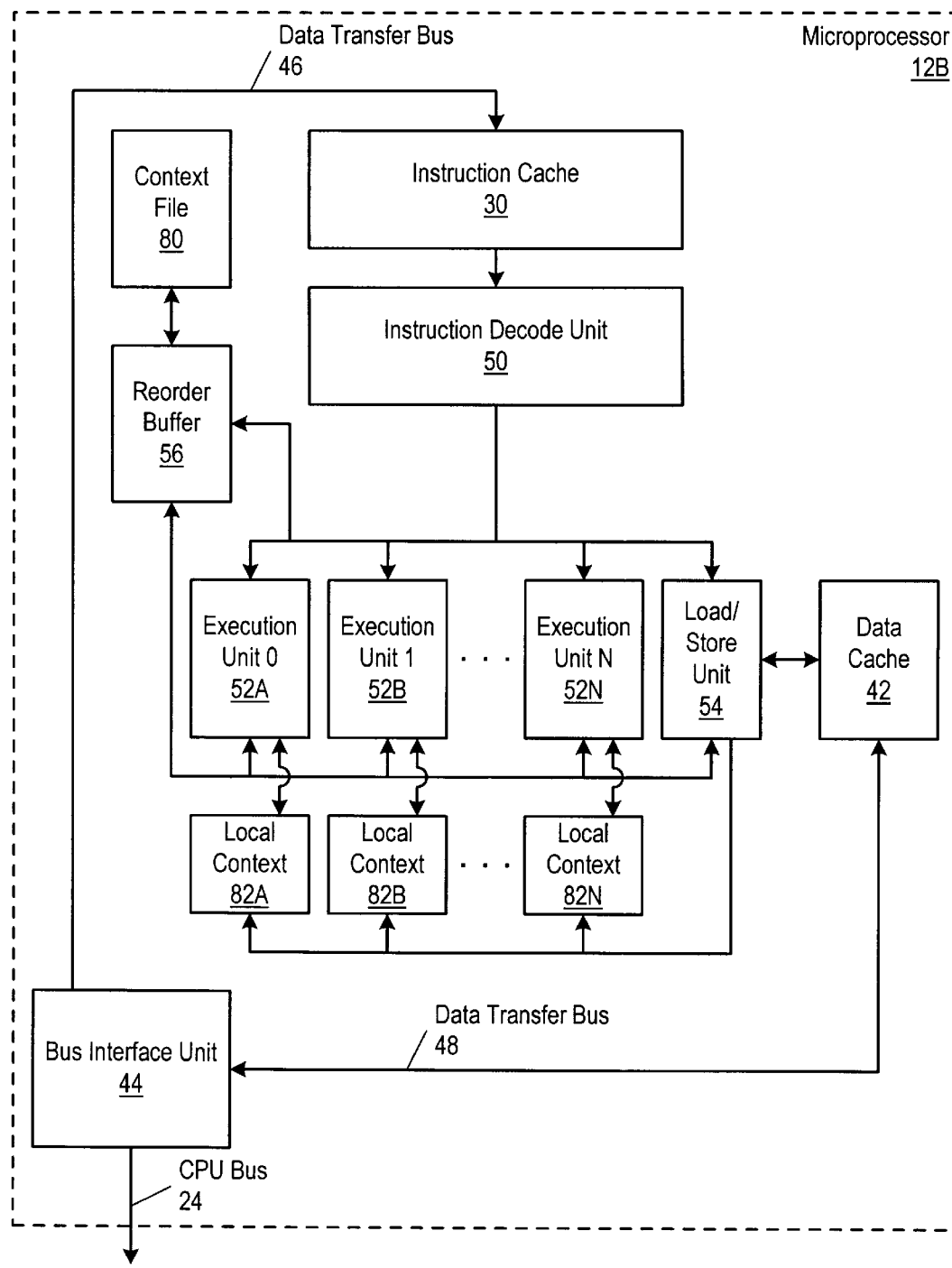
FIG. 5 is a block diagram of another embodiment of the microprocessor shown in FIG. 1.

Turning now to FIG. 5, a second embodiment of microprocessor 12 (microprocessor 12B) is shown. Microprocessor 12B includes bus interface 44, instruction cache 30, instruction decode unit 50, execution units 52, load/store unit 54, data cache 42, and reorder buffer 56 similar to microprocessor 12A. Additionally, microprocessor 12B includes a primary context file 80 and a plurality of local context files 82A–82N (collectively referred to as context files 82). Primary context file 80 is coupled to reorder buffer 56. Each of local context files 82A–82N is coupled to a respective one of execution units 52A–52N. Additionally, each of local context files 82 are coupled to load/store unit 54.

Primary context file 80 includes a full context of microprocessor 12B, and may be used by tasks executing upon microprocessor 12B. Local context files 82 may include full contexts or subsets of contexts. Additionally, when subsets of contexts are embodied in local context files 82, local context files may employ either dissimilar or similar subsets of the context of microprocessor 12B.

Instruction decode unit 50 dispatches instructions in a different manner when included in microprocessor 12B as opposed to microprocessor 12A. Because a particular local context file 82A–82N is coupled to one execution unit 52A–52N, instructions operating within the context defined by the local context file are executed by the associated execution unit 52A–52N. Therefore, when decode unit 50 decodes an instruction having a thread tag indicative of a local context file, decode unit 50 dispatches that instruction to the execution unit coupled to that local context file.

In one embodiment, local context files 82 are ISR context files configured to store contexts for interrupt service routines. Advantageously, one or more execution units 82 may be dedicated for executing interrupt service routines while other units remain available for executing tasks. Furthermore, when no interrupt service routines are executed by microprocessor 12B, the execution units dedicated for executing interrupt service routines may advantageously execute instructions associated with a task. When an interrupt is signalled by bus interface unit 44, the dedicated unit may switch to executing the interrupt service routine without requiring a context save. The instructions instead access their individual contexts according to their thread tags.

It is noted that the terms "full context" and "partial context" have been used in the previous discussion of context files. As used in those discussions, a full context includes the register set of microprocessor 12. Additionally, a full context may include condition flags indicative of the result of executing an instruction as well as other programmable features of microprocessor 12. A partial context includes a subset of the register set. The term "complete context" is synonymous with full context. Other embodiments of microprocessor 12 may include main memory locations in a full context.

Turning now to FIG. 6, an exemplary context 100 as defined by the x86 microprocessor architecture is shown. Context 100 is depicted as it is stored in memory during a context save operation. Across the top of FIG. 6 are bit location numbers indicative of the number of bits shown on a line of context 100. Down the right side of context 100 is an address number indicative (in hexadecimal) of an offset from the beginning of context 100 at which a particular line is stored. Fields within context 100 which are marked "0" are set to a constant zero when context 100 is initialized. Fields with other values are explained below.

At offset zero, the value from the task register (TR) is stored. The value stored is associated with a task which originated the task whose context is stored within context 100. At offset 4, the value of the ESP register associated with a privilege level of zero is stored. As will be appreciated by those skilled in the art, the x86 architecture defines several privilege levels for tasks. At offset 8, the SS segment register associated with privilege level zero is stored. Similarly, the ESP and SS register values associated with privilege level one are stored at offsets C and 10, respectively. Offsets 14 and 18 store the ESP and SS register values associated with privilege level two, respectively.

Beginning at offset 1C and continuing through offset 44 are register values associated with the current context. As will be appreciated by those skilled in the art, the CR3, EIP, EFLAGS, EAX, ECX, EDX, EBX, ESP, EBP, ESI, and EDI registers are registers defined by the x86 microprocessor architecture. It is noted that CR3 is used to perform linear to physical translation if paging is enabled. Similarly, offsets 48 through 5C store the segment values from segment registers ES, CS, SS, DS, FS, and GS. At offset 60, a value identifying the local descriptor table (LDT) is stored. The LDT is part of the address translation mechanism of x86 processors, and may contain segmented to linear address translations associated with the current task. A bit map offset and a trap bit are stored at offset 64. The bit map offset indexes into a system input/output permissions table identifying which input/output devices 16 (shown in FIG. 1) a particular task is permitted to communicate with. The trap bit is used for debugging purposes. If the trap bit is set when a context restore occurs, then processor 12 interrupts to a debug interrupt vector.

Although the above discussion mentions the x86 microprocessor architecture and a microprocessor implementing that microprocessor architecture, the present invention is not limited to the x86 microprocessor architecture. Instead, any microprocessor architecture may be employed.

In accordance with the above disclosure, a microprocessor including multiple contexts such that multiple threads may be concurrently executed is described. The microprocessor may execute interrupt service routines concurrently with tasks. Advantageously, performance of a computer system may be increased by incorporating the multi-threaded microprocessor into the computer system. Clock cycles formerly used to perform context save operations are eliminated in cases where an interrupt service routine may be executed concurrently with a task. Additionally, multiple tasks may be executed concurrently according to one embodiment due to the multiple context storages available.

Numerous variations and modifications will become apparent to those skilled in the art once the above disclosure is fully appreciated. It is intended that the following claims be interpreted to embrace all such variations and modifications.

What is claimed is:

1. A microprocessor comprising:

an instruction cache configured to receive and store a first plurality of instructions belonging to a first program thread, and to assign a first thread tag to the first plurality of instructions belonging to the first program thread, wherein the instruction cache is further configured to receive a first indication of a first interrupt signal which occurs independently of the first plurality of instructions, and in response to receiving the first indication of the first interrupt signal (a) to allocate a second thread tag to a first interrupt service routing corresponding to the first interrupt signal, (b) to receive and store a second plurality of instructions belonging to the first interrupt service routine, and (c) to assign the second thread tag to the second plurality of instructions belonging to the first interrupt service routine;

an instruction decode unit coupled to receive the first plurality of instructions and the second plurality of instructions from the instruction cache, and configured to decode the first plurality of instructions and the second plurality of instructions;

one or more execution units coupled to received the first plurality of instructions and the second plurality of instructions in decoded form from the instruction decode unit, and configured to produce a first plurality of results in response to the first plurality of instructions and a second plurality of results in response to the second plurality of instructions;

a context file coupled to receive the first plurality of results and the second plurality of results;

wherein the instruction cache is configured to store a plurality of thread tags including the first thread tag and the second thread tag;

wherein the context file includes a plurality of context storages in one-to-one correspondence with the plurality of thread tags, wherein the context file is configured to store the first plurality of results in a first context storage of the plurality of context storages in response to the first thread tag, and to store the second plurality of results in a second context storage of the plurality of context storages in response to the second thread tag;

wherein the one or more execution units are configured to execute a first instruction of the first plurality of instructions concurrently with a second instruction of the second plurality of instructions.

2. The microprocessor of claim 1, wherein the instruction cache stores a plurality of indicator values corresponding to the plurality of thread tags, wherein each of the plurality of indicator values indicates either an availability or a non-availability of a corresponding thread tag among the plurality of thread tags for allocation to a second interrupt service routine or a second program thread.

3. The microprocessor of claim 2, wherein the instruction cache is further configured to allocate a third thread tag among the plurality of thread tags to the second interrupt service routine or the second program thread only if a first corresponding indicator value among the plurality of indicator values indicates the availability of the third thread tag.

4. The microprocessor of claim 3, wherein the instruction cache is configured to modify the first corresponding indicator value to indicate the non-availability of the third thread tag in response to allocating the third thread tag to the second interrupt service routine or the second program thread.

5. The microprocessor of claim 2 further comprising a reorder buffer, wherein the reorder buffer is configured to assert an interrupt return signal indicating a completion of the first interrupt service routine, wherein the interrupt return signal includes a second indication of the second thread tag associated with the first interrupt service routine, wherein the instruction cache is configured to modify a second corresponding indicator value corresponding to the second thread tag to indicate the availability of the second thread tag for allocation to a subsequent interrupt service routine or a subsequent program thread in response to receiving the interrupt return signal.

6. The microprocessor of claim 2, wherein the plurality of indicator values are accessible and modifiable by software executing on the microprocessor.

7. The microprocessor of claim 1, wherein the first context storage is configured to store a context set of a predefined microprocessor architecture.

8. The microprocessor of claim 1, wherein the second context storage is configured to store a subset of a context set of a predefined microprocessor architecture.

9. The microprocessor as recited in claim 1, wherein the plurality of context storages includes a local context storage which corresponds to a third thread tag of said plurality of thread tags, wherein the local context storage is coupled to a first execution unit of the one or more execution units, wherein the instruction cache is configured to assign the third thread tag to a third set of instructions belonging to a third program thread, wherein the first execution unit is configured (a) to receive the third set of instructions associated with the third thread tag in decoded form from the instruction decode unit, and (b) to execute the third set of instructions in order to generate a third plurality of results, wherein the local context storage is configured to store the third plurality of results generated by the first execution unit in response to the third set of instructions associated with the third thread tag.

10. The microprocessor as recited in claim 1, wherein the plurality of context storages includes a local context storage which corresponds to a third thread tag of said plurality of thread tags, wherein the local context storage is coupled to a first execution unit of the one or more execution units, wherein the instruction cache is configured to assign the third thread tag to a third set of instructions belonging to a third interrupt service routine in response to a second interrupt signal, wherein the first execution unit is configured (a) to receive the third set of instruction associated with the third thread tag in decoded form from the instruction decode unit, and (b) to execute the third set of instructions in order to generate a third plurality of results, wherein the local context storage is configured to store the third plurality of results generated by the first execution unit in response to the third set of instructions associated with the third thread tag.

11. The microprocessor of claim 1, wherein the instruction cache is further configured to allocate available thread tags among the plurality of thread tags (a) to interrupt service routines including the first interrupt service routine in response to receiving interrupt indications including the first indication and corresponding to the interrupt service routines, or (b) to program threads including the first program thread.

12. A microprocessor comprising:

an instruction cache configured to receive and store a first plurality of instructions belonging to a first program thread, to assign a first thread tag to the first set of instructions, and, in response to an interrupt signal which occurs independently of the first set of instructions, (a) to receive and store a second set of instructions belonging to a first interrupt service routine invoked by the interrupt signal, and (b) to assign a second thread tag to the second set of instructions belonging to the first interrupt service routine;

an instruction decode unit configured to receive the first set of instructions including the first thread tag and the second set of instructions including the second thread tag, wherein the instruction decode unit is further configured to decode the first set of instructions and the second set of instructions;

one or more execution units configured to receive the first set of instructions and the second set of instructions in decoded form from the instruction decode unit, and to generate a first plurality of results in response to the first set of instructions and a second plurality of results in response to the second set of instructions;

a context file couple to receive the first plurality of results and the second plurality of results;

wherein the instruction cache is configured to store a plurality of thread tags including the first thread tag and the second thread tag;

wherein the context file includes a plurality of context storages to one-to-one correspondence with the plurality of thread tags, wherein the context file is configured to store the first plurality of results in a first context storage of the plurality of context storages in response to the first thread tag, and to store the second plurality of results in a second context storage of the plurality of context storages in response to the second thread tag;

wherein the one or more execution units are configured to execute a first instruction of the first plurality of instructions concurrently with a second instruction of the second plurality of instructions.

* * * * *